United States Patent
White et al.

(10) Patent No.: US 11,569,684 B1
(45) Date of Patent: Jan. 31, 2023

(54) BROADBAND ANTENNA MATCHING NETWORK EMPLOYING ENERGY RECOVERY SCHEMES

(71) Applicant: HRL Laboratories, LLC, Malibu, CA (US)

(72) Inventors: Carson R. White, Agoura Hills, CA (US); Walter S. Wall, Calabasas, CA (US); Christopher P. Henry, Thousand Oaks, CA (US); Christopher S. Roper, Santa Monica, CA (US); James H. Schaffner, Chatsworth, CA (US); Ignacio Ramos, Santa Monica, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 11 days.

(21) Appl. No.: 16/867,411

(22) Filed: May 5, 2020

Related U.S. Application Data

(60) Provisional application No. 62/872,053, filed on Jul. 9, 2019.

(51) Int. Cl.
| | |
|---|---|
| *H02J 50/00* | (2016.01) |
| *H01F 29/14* | (2006.01) |
| *H02J 50/27* | (2016.01) |
| *H02J 7/00* | (2006.01) |
| *H01Q 1/22* | (2006.01) |

(52) U.S. Cl.
CPC ............ *H02J 50/005* (2020.01); *H01F 29/14* (2013.01); *H02J 7/00* (2013.01); *H02J 50/27* (2016.02); *H01Q 1/2225* (2013.01)

(58) Field of Classification Search
CPC . H02J 50/27; H02J 50/005; H02J 7/00; H01F 29/14
USPC ...................................................... 343/700 R
See application file for complete search history.

(56) References Cited

U.S. PATENT DOCUMENTS

| | | | | |
|---|---|---|---|---|
| 2007/0232877 A1* | 10/2007 | He | .......................... | H02J 7/025 128/903 |
| 2012/0262004 A1* | 10/2012 | Cook | ..................... | H01Q 1/248 307/104 |
| 2012/0293006 A1* | 11/2012 | Kim | ..................... | H04B 5/0031 307/104 |
| 2013/0300357 A1* | 11/2013 | Mercier | ................... | H02J 7/00 320/108 |

(Continued)

*Primary Examiner* — Ahshik Kim
(74) *Attorney, Agent, or Firm* — Ladas & Parry, LLP

(57) ABSTRACT

An energy conversion device disposed in series with an RF driver circuit and an RF antenna, the energy conversion device being arranged to convert a portion of available RF power from the RF driver circuit into a different form of energy (direct current, thermal, or higher frequency electromagnetic waves such as light) which is converted, if needed, to DC and stored in an energy storage device coupled with the RF driver circuit for supplying recycled electrical energy thereto. The RF antenna may be an electrically small antenna and thus a antenna matching network may be provided between the RF driver circuit and the RF antenna. The energy conversion device may comprise, for example, (i) a transformer in combination with a rectifying circuit, (ii) a full wave rectifier, (iii) a half wave rectifier, (iv) a heat and/or light producing device, an energy converter (such as a generator) or a combination of the foregoing.

24 Claims, 7 Drawing Sheets

(56) References Cited

U.S. PATENT DOCUMENTS

| | | | | |
|---|---|---|---|---|
| 2014/0049422 | A1* | 2/2014 | Von Novak | H02J 50/12 |
| | | | | 342/146 |
| 2014/0361629 | A1* | 12/2014 | Moon | H02J 7/025 |
| | | | | 307/104 |
| 2015/0233987 | A1* | 8/2015 | Von Novak, III | H02J 7/025 |
| | | | | 324/701 |
| 2015/0256097 | A1* | 9/2015 | Gudan | H02J 50/001 |
| | | | | 363/125 |
| 2015/0372541 | A1* | 12/2015 | Guo | H02J 50/27 |
| | | | | 307/104 |
| 2016/0020631 | A1* | 1/2016 | Manova-Elssibony | |
| | | | | H02J 50/001 |
| | | | | 320/107 |
| 2016/0094091 | A1* | 3/2016 | Shin | H01Q 9/0414 |
| | | | | 307/104 |
| 2016/0359378 | A1* | 12/2016 | Kuhn | G01D 11/00 |
| 2017/0288736 | A1* | 10/2017 | Zhou | H01Q 1/248 |

* cited by examiner

BROADBAND ANTENNA MATCHING NETWORK EMPLOYING ENERGY RECOVERY SCHEMES

CROSS REFERENCE TO RELATED APPLICATIONS

This application claims the benefit of U.S. Provisional Patent Application Ser. No. 62/872,053 filed 9 Jul. 2019 and entitled "A Broadband Antenna Matching Network Employing Energy Recovery Schemes", the disclosure of which is hereby incorporated by reference.

STATEMENT REGARDING FEDERALLY SPONSORED RESEARCH OR DEVELOPMENT

This invention was made under US Government Contract N66001-19-C-4018 and therefor the US Government may have certain rights in this invention.

TECHNICAL FIELD

The technology disclosed herein provides a matching network intended to be used to couple signals generated from a radio frequency (RF) source into an antenna.

BACKGROUND

Conventional RF transmitters employ an antenna, matching network, and RF signal generator. As the size of the antenna used in this system becomes small, the quality factor of the matching network generally increases to maintain overall efficiency at the frequency of operation. However, this increase in quality factor reduces the overall bandwidth of the transmitter. A common method of increasing the bandwidth of the transmitter is to add additional resistive elements to the matching network to reduce the overall transmitter quality factor, however this decrease in quality factor results in lower transmitter efficiency due to ohmic losses in the additional resistive elements requiring the RF signal generator to produce higher power signals to compensate.

Transmitters which are small relative to their host platform are desirable for a variety of applications, however at electromagnetic frequencies below the UHF band this becomes difficult to realize due to the fact that the electromagnetic wavelength is generally on the order of or larger than many platforms forcing conventional antenna and transmitters to be relatively large in size. While the size of these antennas can be reduced, doing so typically increases the quality factor of the antenna and matching network and in turn reduces the transmitter bandwidth. The bandwidth of these systems can be increased by adding resistive elements to the matching network however this addition reduces the efficiency of the transmitter. The disclosed technology seeks to overcome these limitations, by providing a method of adding loss to a narrowband/electrically small transmitter in order to increase bandwidth and then recovering and resupplying that lost energy to the RF source to maintain efficiency. In this way, the bandwidth of the transmitter can be increased without substantial losses in efficiency, limited only by the conversion efficiency of devices used in this process.

One known method to circumvent this limitation is to employ a technique known as direct antenna modulation. This technique utilizes time-varying elements in the antenna or matching network to surpass the traditional limits set for linear time-invariant antennas. While effective at improving bandwidth without degrading efficiency, this technique does place some limitations on the modulation scheme due to the fact that switching must occur at zero-crossing points in the time varying evolution of the current in the matching network. For high-power and high frequency applications this technique requires that fast high voltage switching elements be utilized which can be difficult to generate. Finally, this technique relies on switching between discrete elements which in turn requires that each state which the system is to be switched between have a corresponding discrete element.

The current practice, is to add resistive elements to the antenna and/or matching network of electrically small antennas to increase bandwidth at the expense of efficiency. An alternative to this technique is direct antenna modulation which varies antenna and matching network elements in time, but introduces additional limitations and system complexity due to the requirement of needing faster switching elements. The present disclosure teaches a method of increasing transmitter bandwidth without needing time varying elements or without reducing efficiency. It is not obvious based on the prior art how an energy conversion mechanism would be added to an electrically small transmitter and utilized to improve the product of bandwidth and efficiency.

The presently disclosed technology seeks to improve upon these prior inventions by enabling a method for improving the bandwidth of an Electrically Small Antenna (ESA) without significantly reducing efficiency or without requiring switching elements to be employed in the matching network which may limit the output power, frequency, modulation speed, and/or modulation scheme.

BRIEF DESCRIPTION OF THE PRESENT INVENTION

The presently disclosed technology (invention) provides a novel energy convertor/Q-reducing network intended to be used to couple signals generated from a radio frequency (RF) source into an electrically small antenna. The novel energy convertor/Q-reducing network is typically used in conjunction with a conventional impedance matching network. The energy convertor/Q-reducing network includes (i) a conversion device such as but not limited to a resistor, diode, diode bridge, or photodiode, which is capable of converting a portion of generated RF signals into another form of energy such as thermal, direct current (DC) voltage, or higher frequency waves (e.g. optical). The energy convertor/Q-reducing network also includes (ii) an energy recovery mechanism which extracts the converted energy from the conversion device. The choice of recovery mechanism is directly related to the conversion method selected for the conversion device. The energy convertor/Q-reducing network also includes (ii) an energy storage device such as but not limited to capacitor and/or an electrochemical or thermal battery, which stores the converted energy to provide a portion of the power needed to operate the RF source. Unlike traditional RF transmitters which either achieve broad bandwidth at the expense of efficiency by using lossy elements such as resistors to reduce the quality factor of the transmitter, this disclosure provides a technique for improving the bandwidth of an RF transmitter without substantial degradation of efficiency by recovering energy lost in adding resistance to matching and/or antenna elements and recycling that energy back to the RF source for reuse.

In another aspect the presently disclosed technology provides an energy conversion device disposed in series with an RF driver circuit and an RF antenna, the energy conversion device being arranged to convert a portion of available RF power from the RF driver circuit into a different form of energy that is converted, if needed, to DC energy and stored in an energy storage device coupled with the RF driver circuit for supplying recycled DC energy thereto.

DETAILED DESCRIPTION

Figure 1:
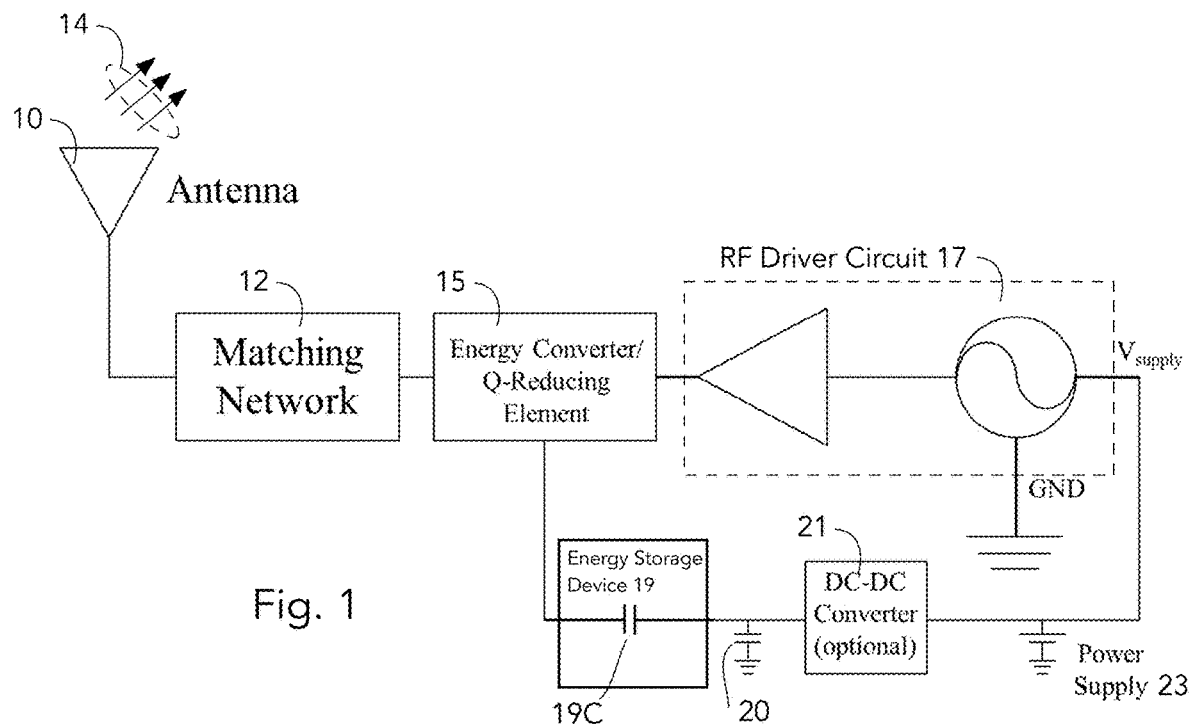
FIG. 1 is a schematic illustration of an embodiment of the present disclosure.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph (f). In particular, the use of "step of" or "act of" in the claims herein is not intended to invoke the provisions of 35 U.S.C. 112, Paragraph (f).

A traditional RF transmitter consists of an antenna 10, a matching network 12, and a RF driver 17. The RF driver circuit 17 typically includes a signal generator, a modulator and an RF amplifier. The matching network 12 is intended to cancel the reactive impedance of the antenna 10 and thus improve the coupling between the RF signals generated by the source (the RF driver 17) and a free space RF wave 14 emitted by the antenna 10. For conventional electrically small antennas (ESAs), the efficiency of the transmitter is primarily determined by the total resistive losses contributed by the antenna and matching network relative to the radiation resistance of the antenna. As the size of the antenna decreases, the reactance of the antenna generally increases forcing the reactance of the matching network to also increase in order to match the antenna at the same frequency. Because the quality factor (Q) of the matching network is equal to the magnitude of the reactance divided by the losses in the matching network, this decreases in antenna size forces the matching network quality factor to increase in order to maintain the same efficiency, which in turn reduces overall transmitter bandwidth assuming that the Q of the antenna is >> than the Q of the matching network. Commonly, the bandwidth of electrically small transmitters is increased by inserting resistive elements into the matching network which reduces overall system Q but at the cost of reduced efficiency.

One purpose of this disclosure is to teach a technique for increasing the bandwidth of electrically small transmitters without reducing efficiency or increasing antenna size. The disclosed technology includes an energy conversion device 15 placed in series with an RF driver 17, matching network 12, and an Electrically Small Antenna 10 (see FIG. 1 and particularly the Energy Converter/Q-Reducing Element 15 shown thereon). The purpose of this energy conversion device 15 is to convert a portion of the available RF power from the RF driver circuit 17 in the circuit into a different form (direct current, thermal, or higher frequency electromagnetic waves such as light) to be stored in an energy storage device 19 and recycled back to the RF driver circuit 17 (via an optional voltage change circuit such as the optional DC-DC Converter 21 and a power supply 23 shown on FIG. 1). The energy storage device 19 may be embodied as a series-connected capacitor, identified as element 19C, and as such the energy storage device 19 stores energy transiently. The power supply 23 may include a battery. Since the disclosed circuitry captures at least some of the energy typically lost to the environment (in prior art designs), the power supply 23 still needs to supply energy to the RF driver circuit 17, just not as much energy as needed by prior art designs.

The the optional DC-DC Converter 21 may be utilized due to different DC voltages being realized at the energy storage device 19 compared to the DC voltage used at the power supply 23. The capacitor 20 shown at the input to the optional DC-DC Converter 21 is an optional device which can be used to suppress spurious signals generated by the DC-DC Converter 21.

Figure 2:
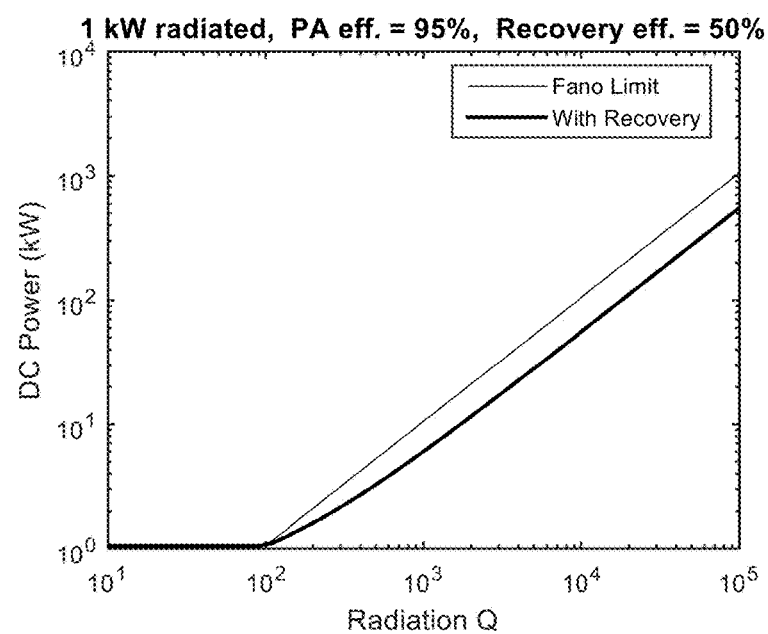
FIG. 2 is a graph of a plot showing the predicted reduction in DC or input power required to radiate 1 KW at different radiation quality factors (or Q's) with conventional (or Fano-limited) matching and using an energy recovery process with a recovery efficiency of 50%.
Figure 3:
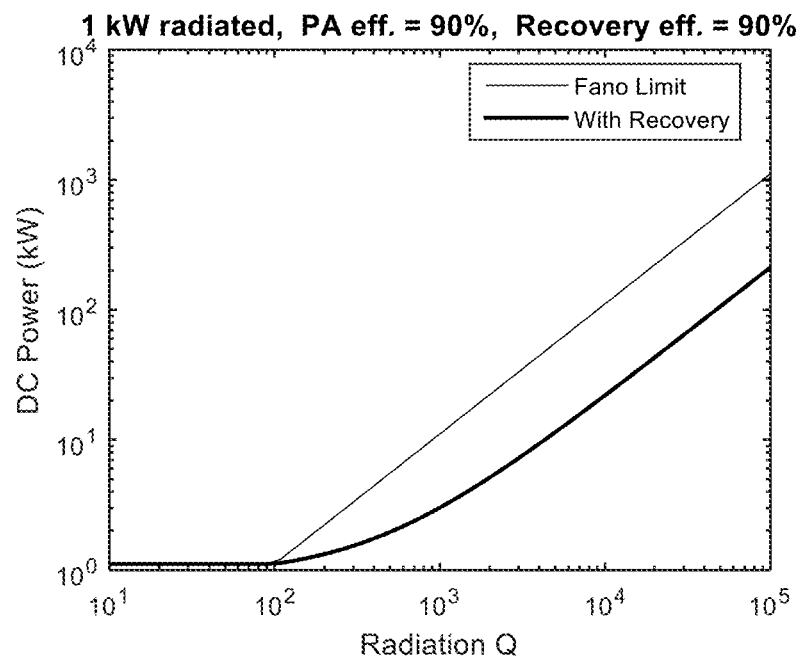
FIG. 3 is a graph of a plot showing the predicted reduction in DC or input power required to radiate 1 KW at different radiation quality factors (or Q's) with conventional (or Fano-limited) matching and using an energy recovery process with a recovery efficiency of 90%.
Figure 4:
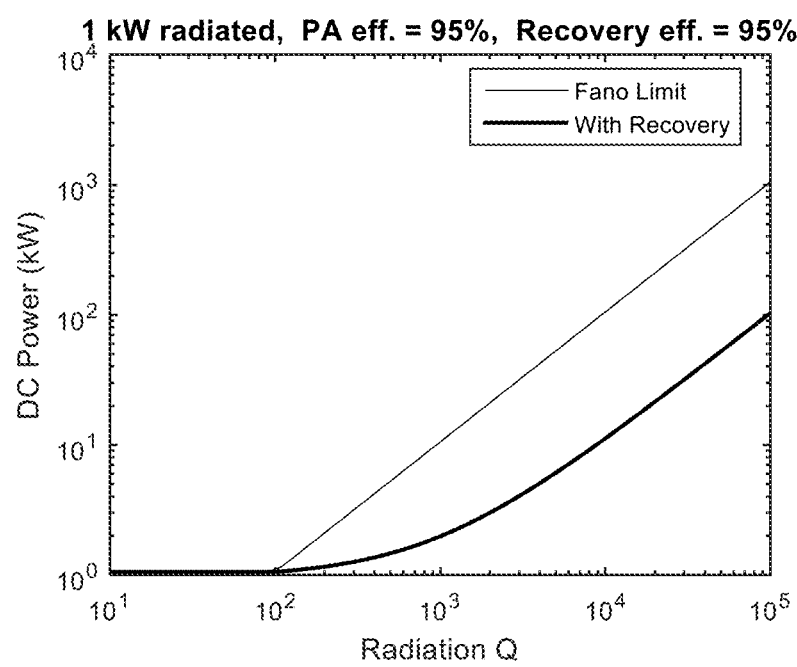
FIG. 4 is a graph of a plot showing the predicted reduction in DC or input power required to radiate 1 KW at different radiation quality factors (or Q's) with conventional (or Fano-limited) matching and using an energy recovery process with a recovery efficiency of 95%.

FIGS. 2, 3, and 4, show plots of how the required input power supplied to a transmitter (having a RF driver 17) emitting 1 kW is decreased for different values of recovery efficiency as a function of radiation Q (which, as previously mentioned, scales inversely with antenna size). At a recovery efficiency of 50% the required input power can be decreased by roughly a factor of 1.96 relative to the Fano limit, which represents the minimum input power that can be achieved with a conventional transmitter of a particular Q. As the recovery efficiency is increased to 95% this improvement in required input power is decreased by a factor 34.96 relative to the Fano limit.

Figure 5:
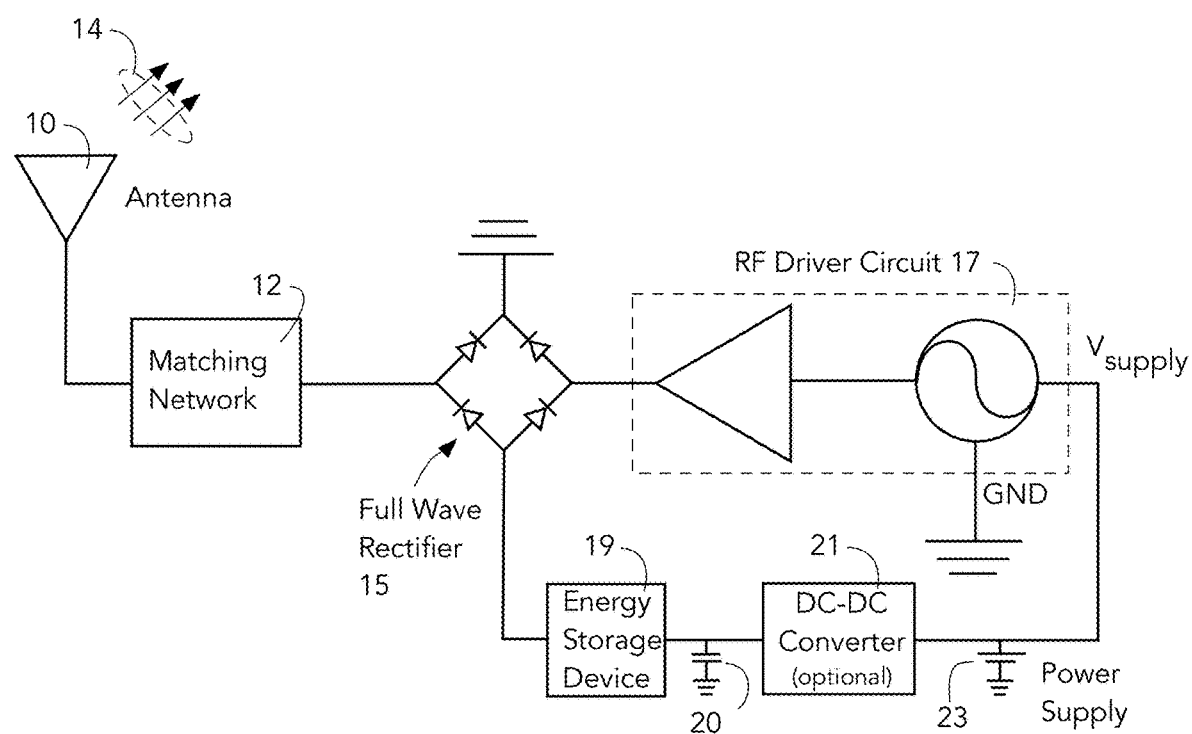
FIG. 5 is a schematic illustration of an embodiment wherein a full bridge rectifier is used to convert a portion of the RF energy in a transmitter into a DC voltage which is stored across an energy storage device for reuse by the RF driver circuit.

Several embodiments of the disclosed technology are described below. One embodiment comprises a full bridge rectifier 15 connected in series with an Electrically Small Antenna 10, matching network 12, and RF driver 17 as shown in FIG. 5. This rectifier 15 preferably consists of four diodes connected in a loop in a polarity alternating fashion. This full wave rectifier 15 is electrically connected to the RF driver circuit 17 across two opposing sides of the loop as shown in FIG. 5. One of the other two sides of the loop is electrically connected to a common ground and the last remaining side is electrically connected to an energy storage device 19 which may comprise a capacitor 19C. The capacitor 19C is then electrically connected directly (or indirectly via circuit 21) to the voltage supply 23 of the RF driver circuit 17, which nominally includes or is associated with a battery, but could comprise a conventional DC power supply 23. In this way, the rectifier 15 acts as a lossy element in the transmitter (the transmitter comprising elements 10, 12 and 17) reducing overall quality factor (Q) by converting a portion of the RF power into DC power. However, since this DC power is resupplied to the RF driver circuit 17, the total transmitter efficiency is only reduced by the amount of power lost in the energy conversion process. The full bridge rectifier 15 of FIG. 5 functions as the Energy Converter/Q-Reducing Element 15 of FIG. 1.

Figure 6:
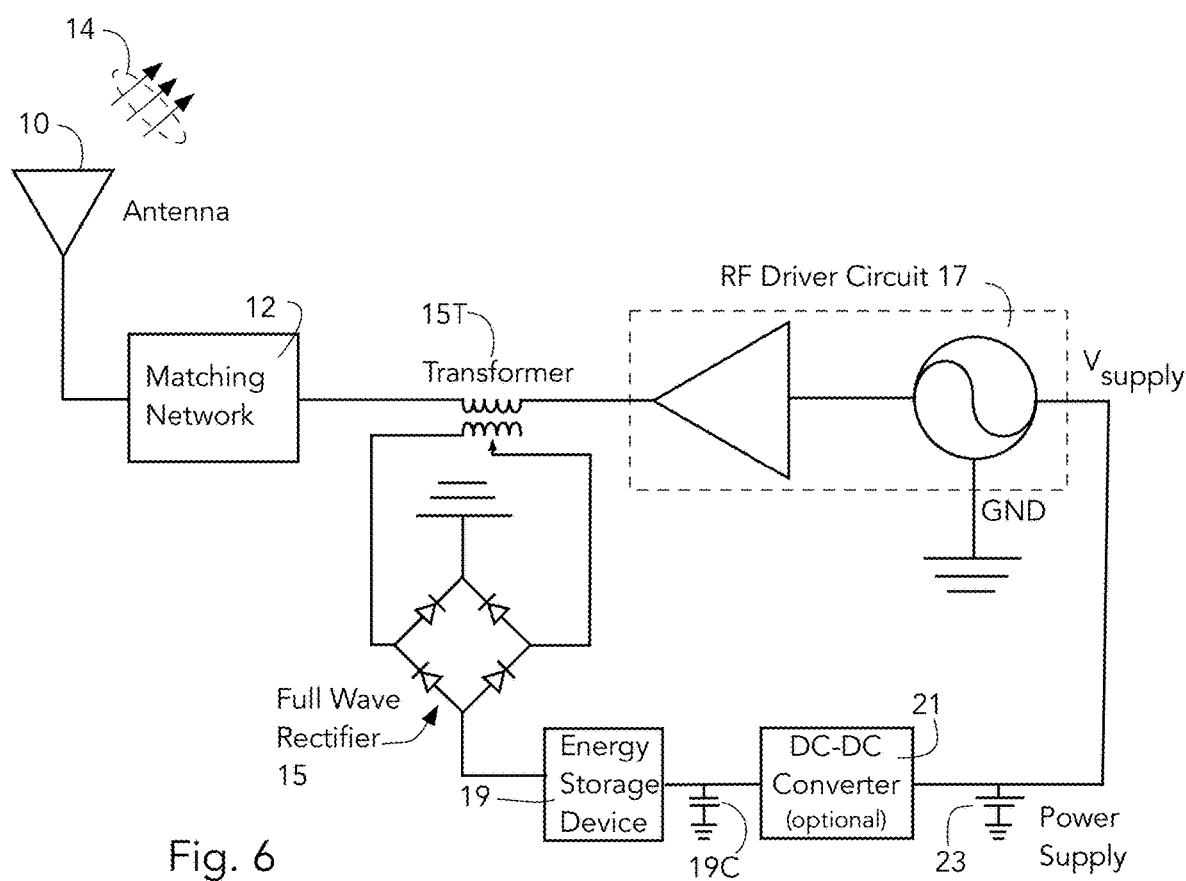
FIG. 6 is a schematic illustration of a variation of the embodiment of FIG. 5. In this embodiment a transformer is used to inductively couple a full bridge rectifier to an RF transmitter circuit and convert a portion of the RF energy in the transmitter into a DC voltage which is stored across an energy storage device for reuse by the RF driver circuit.

In a variation on the embodiment of FIG. 5, a transformer 15T (see FIG. 6) is used to inductively couple the full wave rectifier 15 to the RF transmitter comprising elements 10, 12 and 17. In this variation, one side of the transformer 15T is electrically connected between the RF driver circuit 17 and the matching network 12 as shown in FIG. 6. The other side of the transformer 15T is electrically connected across two opposing sides of the rectifier loop of the full wave rectifier 15 and, as in the preceding embodiment of FIG. 5, the other two sides of the rectifying loop are electrically connected to a common ground on one side thereof and to the power supply (possibly a battery) 23 on the other side thereof via the energy storage device 19 which may comprise a capacitor 19C as previously mentioned. The advantage of the embodiment of FIG. 6 compared with the embodiment of FIG. 5 is that by adjusting the coupling ratio (e.g. the turns ratio) between the primary and secondary of the transformer 15T the amount of RF energy converted to stored DC voltage can be tuned to adjust the bandwidth of the transmitter. The turns ratio can be varied, for example, by utilizing a variable transformer 15T as depicted in FIG. 6. Transformer 15T may then be embodied as a variable autotransformer. Alternatively, transformer 15T may be of a conventional fixed turns ratio type. The transformer 15T in combination full bridge rectifier 15 of FIG. 6 functions as the Energy Converter/Q-Reducing Element 15 of FIG. 1.

Figure 7:
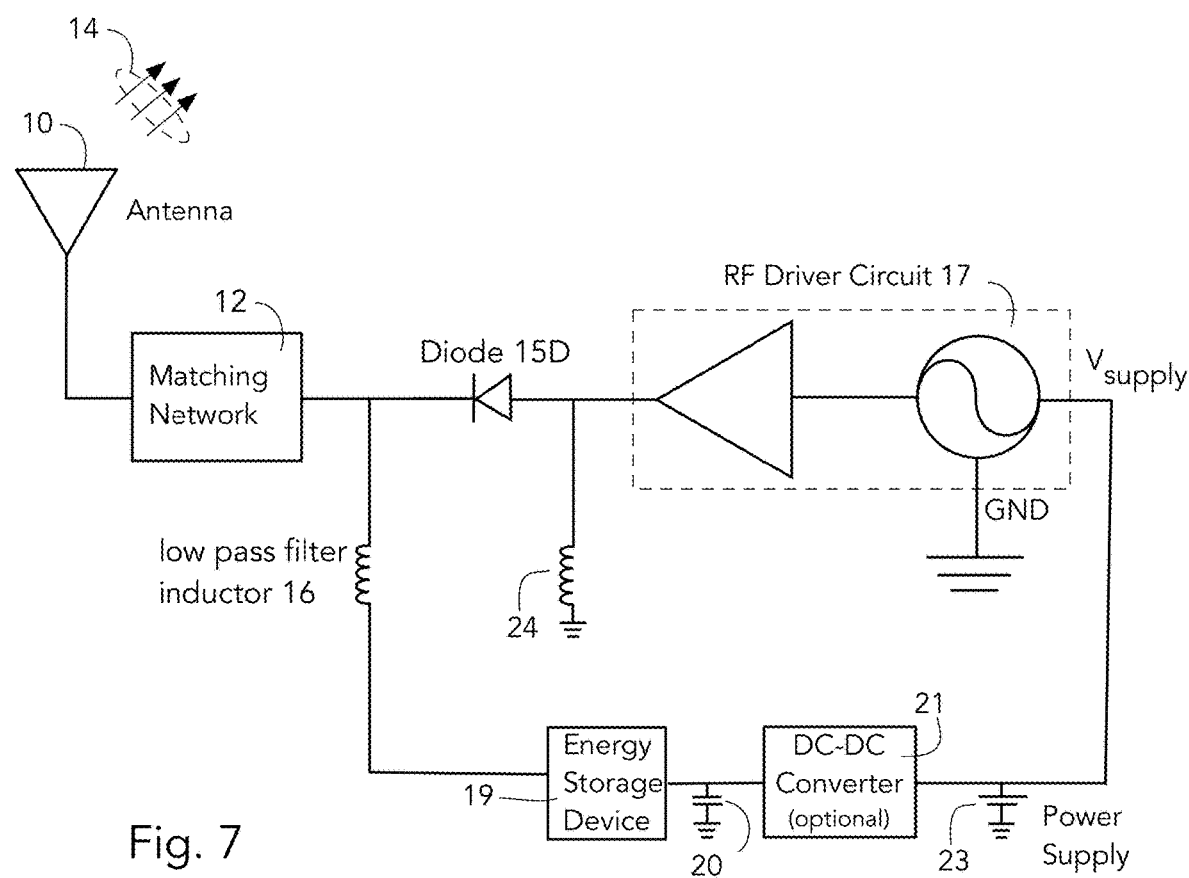
FIG. 7 is a schematic illustration of another variation of the embodiment of FIG. 5. In this embodiment a diode is used to convert a portion of the RF energy in a transmitter into a DC voltage which is stored across an energy storage device for reuse by the RF driver circuit. An inductor is placed in shunt at the diode to allow DC voltage generated by the diode to be coupled into the energy storage device while minimizing RF loss in the circuit.

In yet another variation on the embodiment of FIG. 5, a single diode 15D may be used in place of the full bridge rectifier 15 as shown by FIG. 7. In this embodiment a single diode 15D is electrically connected in series in between the matching network 12 and the RF driver circuit 17. An additional inductor 16 is connected in shunt connecting the diode 15D to the power supply (typically a battery) 23 via the energy storage device 19 (which may be a capacitor 19C) as shown in FIG. 7. This shunt inductor 16 acts as a low pass filter, minimizing RF loss in the circuit while allowing DC voltage generated by the diode 15D to be efficiently stored across the battery 23 and also a capacitor 19C of the energy storage device 19. This variation, shown in FIG. 7, can also be implemented with the transformer 15T described with reference to the embodiment of FIG. 6, by replacing the full bridge rectifier 15 of FIG. 6 with the diode 15D and shunt inductor 16 of FIG. 7. The inductor 24 in FIG. 7 provides a DC current path for the rectified current. It is optional if RF driver circuit 17 is DC coupled but is needed if driver circuit 17 is AC coupled (for example, if there is a capacitor in series with it).

The polarity directions of the diodes depicted in FIGS. 5, 6 & 7 are established for a negative ground system. If a positive ground system were used instead then polarity directions of each of the depicted diodes would be reversed compared to that is shown in those figures.

The antennas 10 shown in FIGS. 5-9 are assumed to be ESAs (Electrically Small Antennas) which, in typical embodiments, need a Matching Network 12 in order to operate to the RF driver circuit 17 at reasonable efficiencies. If the antennas 10 shown in FIGS. 5-9 are assumed to be more or less full sized antenna (with little or reactance), then a Matching Network 12 may be omitted if desired.

Figure 8:
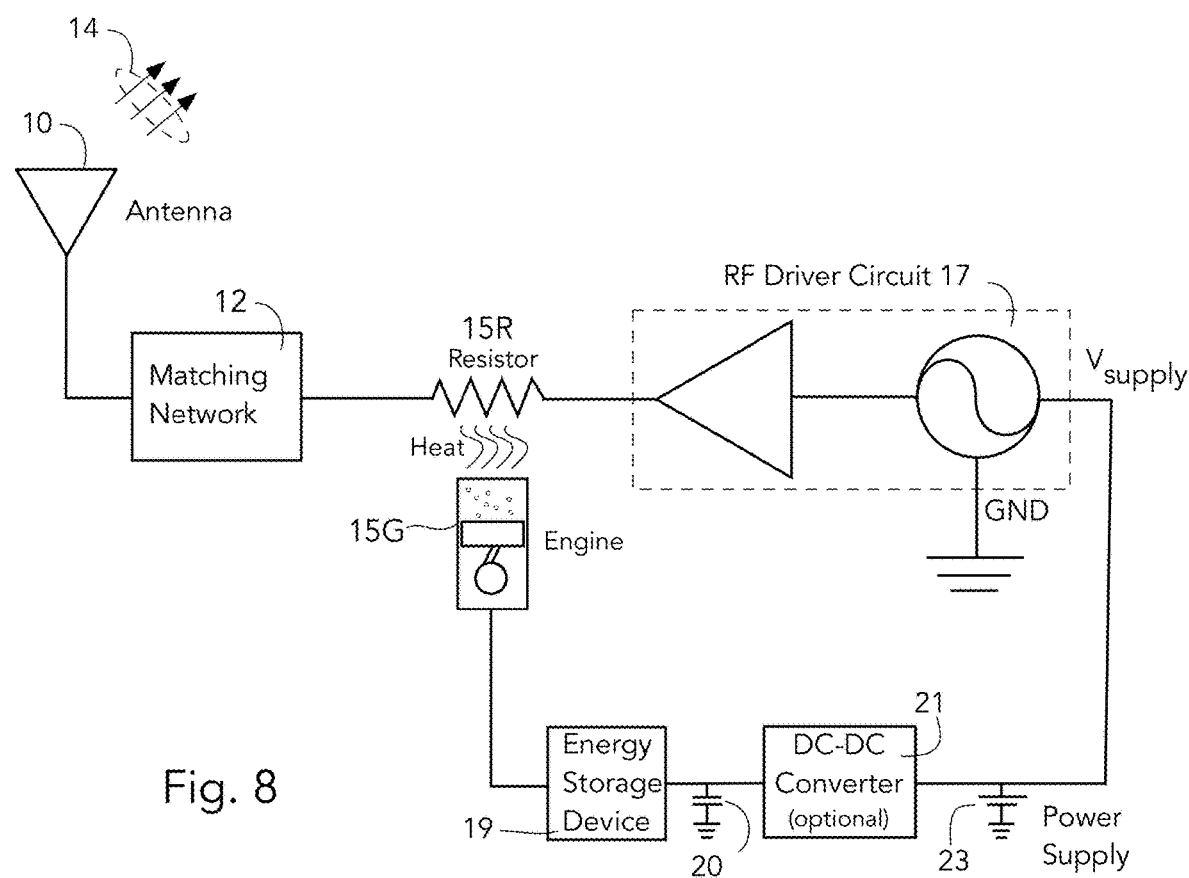
FIG. 8 is a schematic illustration of another embodiment. In this embodiment a device possessing ohmic loss such as a resistor is used to convert a portion of the RF energy in a transmitter into thermal energy which is then converted into a DC voltage by an engine and stored across an energy storage device for reuse by the RF driver circuit.

In another embodiment, a device 15R possessing ohmic losses, such as but not limited to resistors, plasma devices, and vacuum tubes, is depicted as being electrically connected between two elements in an RF transmitter circuit comprised of an antenna 10, matching network 12 and RF driver circuit 17 (see FIG. 8). This ohmic loss device 15R may be thought of as the resistance introduced into prior art matching networks in order to increase the bandwidth of antenna systems with Electrically Small Antennas. Instead of losing the energy as heat to the environment the heat is instead is thermally coupled to a thermal-to-electric generator 17G (e.g. a thermoelectric generator, a thermionic generator, a Johnson thermoelectric energy converter, a thermogalvanic cell, etc.) or a heat engine (e.g. Stirling engine, Rankine engine, Organic Rankine, Brayton cycle engine, Ericsson cycle engine, thermo-acoustic, etc. connected to an electrical generator (i.e. a mechanical-to-electrical generator)), which creates a DC or AC voltage in response to heat generated by the ohmic source 15R. In the case of an engine which generates an AC signal, an additional rectifying circuit (not shown) is required which can convert the AC signal into a DC voltage for storage across a battery in power supply 23.

The object is to increase the bandwidth of an Electrically Small Antenna by using an energy convertor 15 (see FIG. 1 again) to recycle the energy back to the RF driver circuit 17 instead of loosing it to the environment. The energy convertor can conceptually be the resistor of 15R of FIG. 8, but the other embodiments disclosed herein are more technologically elegant. But this embodiment does help to explain why the other embodiments serve to increase the bandwidth of an Electrically Small Antenna while at the same time recovering at least some of the energy normally lost to the environment in prior art designs.

In a variation on the embodiment of FIG. 8, a thermal bath (e.g. a phase change material or a sufficiently large mass that is sensibly heated), which is a medium used to capture and store heat generated by the ohmic device, is implemented to surround the ohmic devices. This thermal bath provides not only better coupling between the ohmic device and the engine, but also a mechanism for regulating energy storage in the transmitter. DC voltage generated by the thermal engine is then stored across a battery 23 for reuse by the RF driver circuit 17. As in the other embodiments additional power is externally supplied to the battery 23 to ensure the transmitter output achieves a desired field 14 strength.

Figure 9:
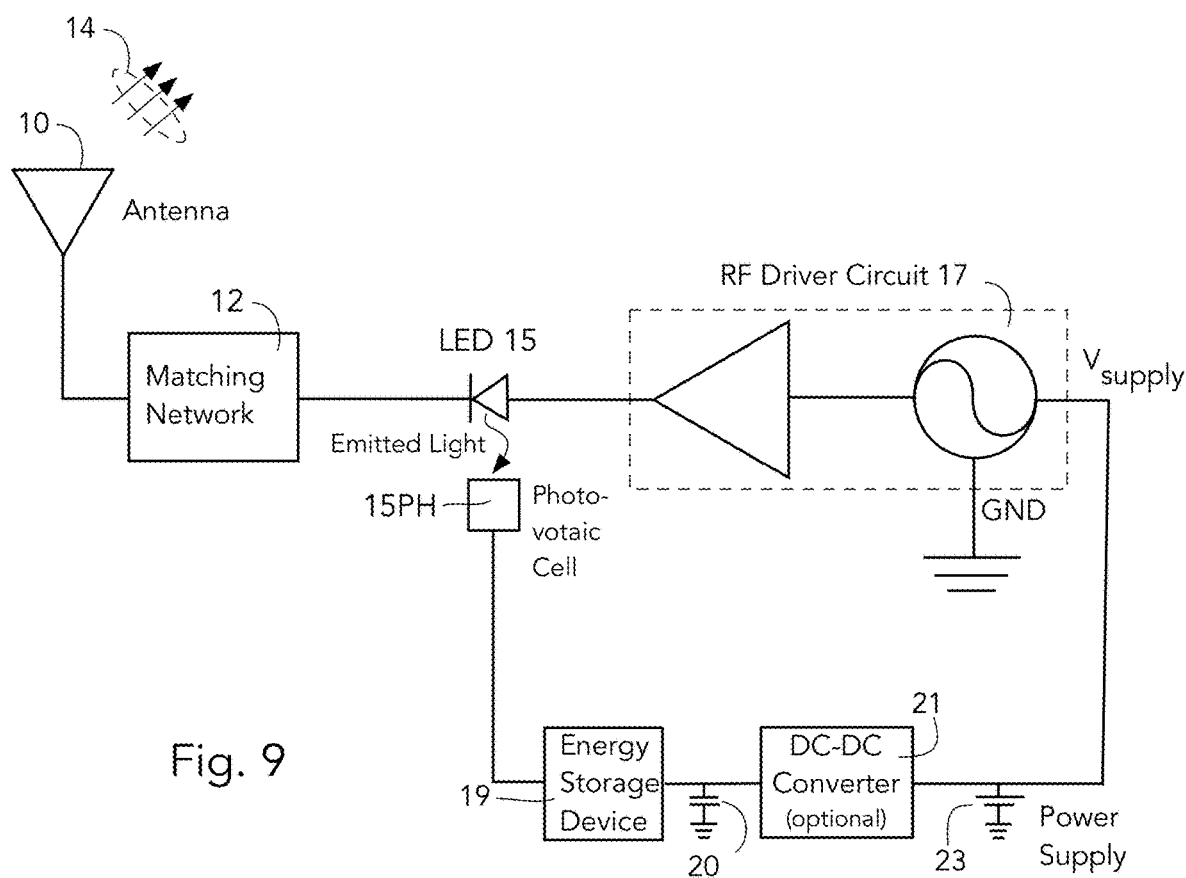
FIG. 9 is a schematic illustration of another embodiment. In this embodiment a light emitting device such as an LED is used to convert a portion of the RF energy in a transmitter into energy at a higher electromagnetic wavelength, such as optical wavelengths. These optical signals are then coupled into a photodetecting device such as a photo-voltaic cell which then converts this energy into a DC voltage which is then stored across an energy storage device for reuse by the RF driver circuit.

In a final embodiment, a light emitting device, such as but not limited to a light emitting diode 15LED or laser is electrically connected between two elements in an RF transmitter circuit comprised of an antenna 10, matching network 12, and RF driver circuit 17 (see FIG. 9). This light emitting device is optically coupled, either through free space propagation or optical coupling devices such as optical waveguides and optical fibers, to a photo-detection device such as but not limited to a photo-voltaic cell 17PH or a photo-detector. Optical energy generated at the light emitting device 17LED is converted into a DC voltage at the photo-detecting element and then stored across a battery 23 for reuse by the RF transmitter 17. As with the preferred embodiment additional power may be externally supplied to the battery 23 to ensure the transmitter output achieves the desired field strength. In the case of an LED, an inductor can be introduced in shunt, similar to the configuration shown in FIG. 7 to recover any voltage rectified by the LED to further improve conversion efficiency.

In the preceding embodiments the antenna is defined as being an Electrically Small Antenna, which is an antenna having active (driven) elements each nominally a quarter wavelength in size. Typically an Electrically Small Antenna has active (driven) elements each nominally much less than a quarter wavelength in size. The present disclosure is described in terms of improving the efficiencies of transmitter circuits designed for use with Electrically Small Antennas due to the existence of resistive elements often found in prior art matching networks, but the described embodiments are not limited to use with Electrically Small Antennas. They may also be used with full size antennas, but the advantages of doing so will be reduced since there is then less motivation to include resistive elements in a matching network. The matching network 12 may be of a conventional design such as a pi network and preferably has no intentional resistive elements embodied therein, but rather has an energy convertor 15 circuit connected thereto as described with reference to the preceding embodiments.

In each of the preceding embodiments, the Energy Storage Device 19 may comprise a capacitor 19C (which may be embodied in the power supply 23 if desired, especially if no DC-DC convertor 21 is utilized) moreover if the power supply 23 includes a battery, then that battery may function as the Energy Storage Device 19.

Having now described the technology in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An energy conversion device arranged in series between an output of an RF driver circuit and an input of a matching network, the matching network being coupled with an antenna.

2. An energy conversion device according to claim 1 which is arranged to convert a portion of generated RF power from the RF driver circuit into a different energy form that is converted, if needed, to DC energy and stored in one or more energy storage devices for recycling DC energy to the RF driver circuit.

3. An energy conversion device according to claim 2 wherein the different energy form is selected from the group consisting of direct current energy, thermal energy, or higher frequency electromagnetic wave energy including light.

4. An energy conversion device according to claim 3 wherein the antenna is an electrically small antenna.

5. An energy conversion device according to claim 4 wherein the energy conversion device comprises a full wave rectifier circuit having two ports thereof connected between the RF driver circuit and the matching network while another two ports of the full wave rectifier circuit are connected with the energy storage device.

6. An energy conversion device according to claim 5 wherein the first mentioned ports of the full wave rectifier are connected between the RF driver circuit and the matching network via a transformer.

7. An energy conversion device according to claim 6 wherein the transformer is a variable turns transformer.

8. An energy conversion device according to claim 4 wherein the energy conversion device comprises a diode connected in series between the output of the RF driver circuit and the input of the matching network.

9. An energy conversion device according to claim 8 further including a low pass filter connected between the diode and the energy storing device.

10. An energy conversion device according to claim 4 wherein the energy conversion device includes at least one diode having one port connected thereof between the RF driver circuit and the matching network while another port thereof is connected with the energy storage device.

11. An energy conversion device according to claim 10 wherein the first mentioned port of the at least one diode is connected between the RF driver circuit and the matching network via an inductive device, the inductive device preferably comprising a transformer.

12. An energy conversion device according to claim 1 wherein the RF driver circuit generates, in use, RF energy that is applied to the antenna via the matching network.

13. An energy conversion device disposed in series with an RF driver circuit and an RF antenna, the energy conversion device being arranged to convert a portion of available RF power from the RF driver circuit into a different form of energy that is converted, if needed, to DC energy and stored in an energy storage device coupled with the RF driver circuit for supplying recycled DC energy thereto.

14. The energy conversion device according to claim 13 wherein the different energy form is selected from the group consisting of direct current energy, thermal energy, or higher frequency electromagnetic wave energy such as light.

15. The energy conversion device according to claim 14 wherein the antenna is an electrically small antenna.

16. The energy conversion device according to claim 13 wherein the energy conversion device comprises a full wave rectifier circuit having two ports thereof connected between the RF driver circuit and the RF antenna while another two ports of the full wave rectifier circuit are connected with the energy storage device.

17. The energy conversion device according to claim 16 wherein the first mentioned ports of full wave rectifier are connected between the RF driver circuit and the RF antenna via a transformer.

18. The energy conversion device according to claim 17 wherein the transformer is a variable turns transformer.

19. The energy conversion device according to claim 13 wherein the energy conversion device comprises a diode connected in series between an output of the RF driver circuit and the matching network.

20. The energy conversion device according to claim 19 further including a low pass filter connected between the diode and the energy storing device.

21. An energy converting network for coupling signals generated by a radio frequency (RF) source into an electrically small antenna, the energy converting network including:
(i) an energy conversion device, which is capable of converting a portion of generated RF signals into another form of energy;
(ii) an energy recovery apparatus which extracts the another form energy from the conversion device;
(ii) an energy storage device selected from the group including at least a capacitor and/or an electrochemical or thermal battery, which stores the converted energy to provide a portion of the power needed to operate the RF source;
the energy converting network improving a bandwidth of an RF source without substantial degradation of efficiency by recycling energy otherwise lost by resistance elements back to the RF source for reuse.

22. An energy converting network according to claim 21 wherein the energy conversion device is selected from the group including at least a resistor, diode, diode bridge, and photodiode, which is capable of converting said portion of generated RF signals into said another form of energy selected from the group including at least thermal, direct current (DC) voltage, and higher frequency electromagnetic waves.

23. An energy conversion device disposed in series between an RF driver circuit and an RF antenna, the energy conversion device being arranged to convert a portion of RF power generated by the RF driver circuit into DC energy that is coupled, in use, with the RF driver circuit for supplying the DC energy converted by the energy conversion device to the RF driver circuit while the RF driver circuit is generating RF power.

24. An energy conversion device according to claim 23 wherein the first mentioned portion of RF power generated by the RF driver circuit converted into DC energy and wherein another portion of the RF power generated by the RF driver circuit is coupled as RF energy into the RF antenna.

* * * * *